United States Patent Office 3,473,335
Patented Oct. 21, 1969

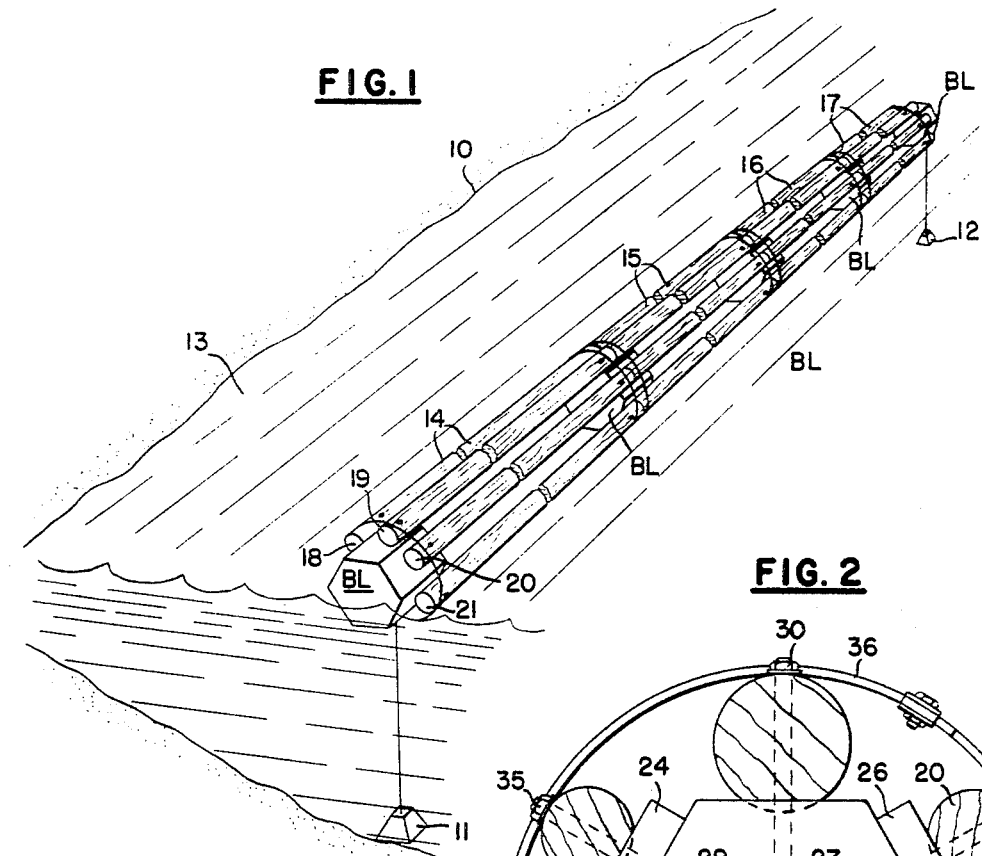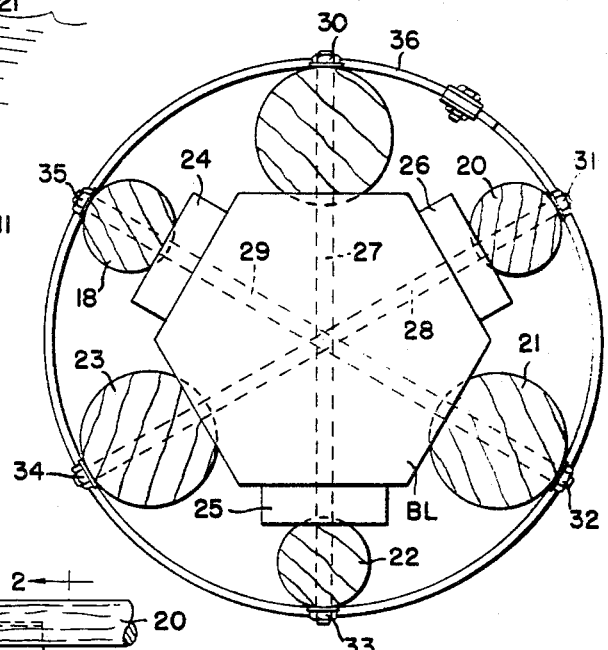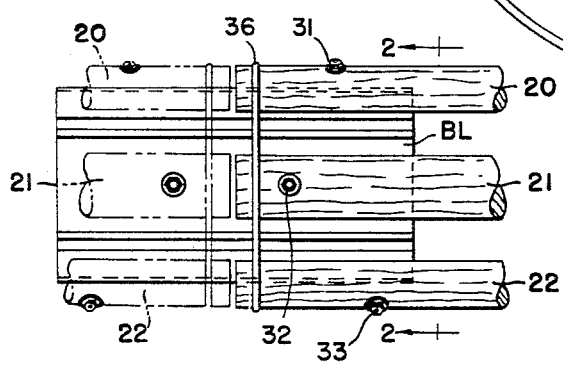

3,473,335
FLOATING SEAWALL
Robert H. Launer, 353 SW. 7th Terrace,
Boca Raton, Fla. 33432
Filed May 6, 1968, Ser. No. 726,701
Int. Cl. E02b 3/06
U.S. Cl. 61—5          5 Claims

ABSTRACT OF THE DISCLOSURE

A floating seawall intended to be anchored off shore a short distance from the shore line to break up the action of waves and prevent erosion of the shore.

The invention contemplates a plurality of longitudinally extending timbers secured to a suitable hub member to provide a cradle or crib of circumferential configuration, of extended length and rigid in construction. The action of the waves upwardly through the timbers breaks the force of the waves and reduces their force.

---

My invention relates to seawalls for the protection of life and property and more particularly to structure which I have termed a "Floating Seawall" for essentially that is what it is, since it contains all the preferred attributes of a fixed seawall, while eliminating the objections and weakness of present fixed seawall construction when subject to adverse weather conditions such as hurricanes and high tides.

The inventor being cognizant of the failure of present day seawalls and jetties has evolved a method of reducing and minimizing the wave action as it contacts the shore line or beach, thereby reducing to a large extent the eroding action on the area and will act to deposit sand and build up the beach immediately adjacent the ocean.

It has long been a problem and a costly one to try to solve the deterioration of our shores by the turbulence set up by the action of the waves during adverse weather conditions. I have found that by setting up a counter-turbulence some distance from the shore line and destroying the inertia of the waves by a counter force that I can reduce by a considerable amount, approximately 60% of the force of the waves on the shore line and eliminate sand pumping operations to replace sand that has been displaced by the action of the waves.

The novel structure of my invention has a two-fold purpose in that it not only sets up a counter turbulence to minimize the wave action, but acts as a protection to bathers from high waves since it provides a protective barrier between the shore line and the open water.

In accordance with the preferred embodiment of my invention, I have conceived a structure wherein a plurality of timbers of substantial length and size are assembled in such a manner so as to provide an elongated cradle or crib like structure with the elements so spaced apart to permit wave action therebetween when the device of my invention is floated off shore and anchored in place.

In my device, which will hereafter be described in detail, I have found that the spacing of the longitudinally extending timbers and the contour thereof with respect to each other will cause a turbulence that results in reversing the direction of some of the water that rises perpendicularly up through the timbers of the floating seawall.

I have learned that this counter-force acts to destroy the force that is producing the wave, thus the restricted or tamed down wave, after cresting, will again drop down between the timbers of the floating seawall thus distorting its direction and neutralizing a portion of its force, thereby changing power into heat and destroying the major force of the wave.

What I have evolved in my invention is that I have improved on nature by causing the action of the wave itself to act as a counter force.

It is well known that when a wave reaches a particular height in relation to its base and with the wind pressure involved, the top of the wave, which is now a white cap, will lean forward and drop into the trough of the rising water. This wave action is a direct counter force to the wave itself and in a short distance kills the particular wave.

In my floating seawell I have captured the counter force of the waves and converted them into means for taming down the action of the sea, in fact encouraging them to act against each other to reduce their destructive power.

An object of my invention is to provide a floating seawall or crib so constructed that when it is anchored off shore and extends for some distance parallel with the shore for example from 500 to 800 feet, that the waves emanating from the ocean will be obstructed, broken up and their force considerably diminished by the time they reach the shore, thereby reducing the destructive action to a considerable degree.

Another object of my invention is the provision of a floating seawall or barrier which will be economical to construct and maintain.

Other objects and advantages will be readily apparent from the following detailed description when read in connection with the following drawing of which, FIGURE 1 is a fore-shortened perspective view with the floating seawall of my invention extending some distance along the shore line and anchored in position.

FIGURE 2 is an enlarged cross-sectional view taken on line 2—2 of FIGURE 3.

FIGURE 3 is a fragmentary elevational view of the joint between the abutting timbers, showing the bands and bolts which secure the assembly together as a unit.

As shown in the drawing and with particular reference to FIGURE 1, the floating seawall or barrier SW of my invention is floating on the surface of the water 13 some distance off shore from the shore-line 10 by means of the anchors 11 and 12.

The structure as disclosed comprises a plurality of similar sections 14, 15, 16 and 17, each of these sections secured together as will hereinafter be described to provide a seawall of any desired length. Each section comprises a plurality of longitudinally extending timbers 18, 19, 20, 21, 22 and 23. These timbers may be of tapered configuration as shown, such as a tree trunk, and are substantially circular in cross section. Suitable blocks 24, 25 and 26 are used to shim out the top ends 18, 20 and 22 which are of less diameter than the butt end of timbers 19, 21 and 23.

As shown in detail in FIGURE 2, the timbers 18, 19, 20, 21, 22 and 23 are secured to the hexagonal joining blocks or hub members BL, by means of the through butts 27, 28 and 29 and the nuts 30, 31, 32, 33, 34 and 35 and further reenforced by the band or strap 36.

The structure as shown and described may be of any desired length since the individual sections are joined firmly together at their meeting ends to provide an extending rigid structure by means of the joint as shown in detail in FIGURE 3.

What is claimed is:

1. A floating seawall or barrier intended for placement off-shore on the surface of the water, comprising a plurality of longitudinally extending cage-like sections joined together to provide a rigid elongated structure, each of said sections comprising a plurality of timber members spaced apart and positioned around the periphery of a common hub member and having their end portions rigidly secured thereto, the ends of the timber members of each section are in abutting relation with the timbers in the next adjacent section, and are also secured to the common hub member, to provide a longitudinally extending rigid structure of infinite length.

2. A floating seawall or barrier intended for placement off-shore on the surface of the water as exemplified in claim 1 characterized in this that the hub members have a substantially hexagonal outer surface.

3. A floating seawall or barrier intended for placement off-shore on the surface of the water, as exemplified in claim 1 characterized in this that spacing blocks are positioned between the ends of the timbers and the surface of the hub to provide for the varying diameters of the timbers.

4. A floating seawall or barrier intended for placement off-shore on the surface of the water, as exemplified in claim 1 characterized in this that spaced apart anchoring means are secured to certain of said hub members.

5. A floating seawall or barrier intended for placement off-shore on the surface of the water, as exemplified in claim 1 characterized in this that reenforcing bands surround the abutting ends of the timbers adjacent their ends thereof.

References Cited

UNITED STATES PATENTS

| | | | |
|---|---|---|---|
| 1,175,962 | 3/1916 | Lantham | 61—4 |
| 2,228,529 | 1/1941 | Moeller | 61—5 X |
| 3,426,537 | 2/1969 | Chenoweth et al. | 61—5 |

PETER M. CAUN, Primary Examiner